July 25, 1967  S. KAMINS ET AL  3,332,603
LAMINATED POUCH CONSTRUCTION
Filed Jan. 5, 1966
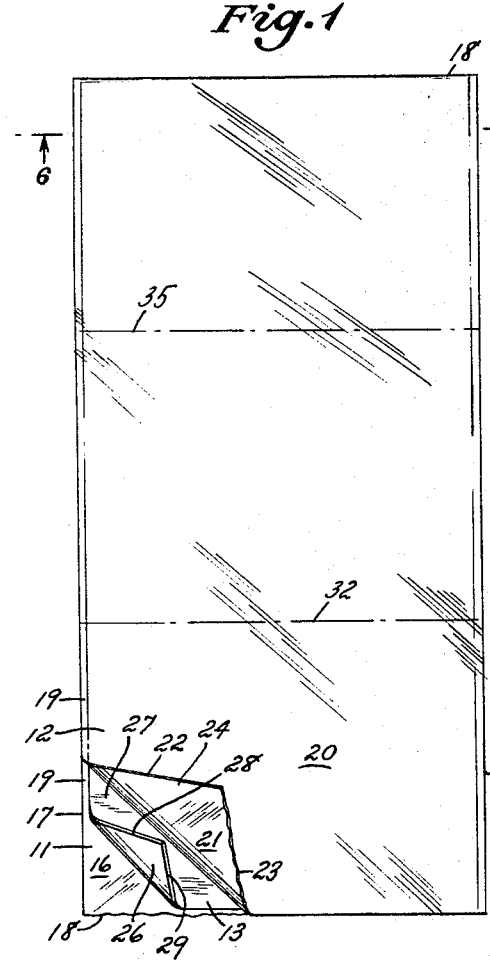
Fig.1
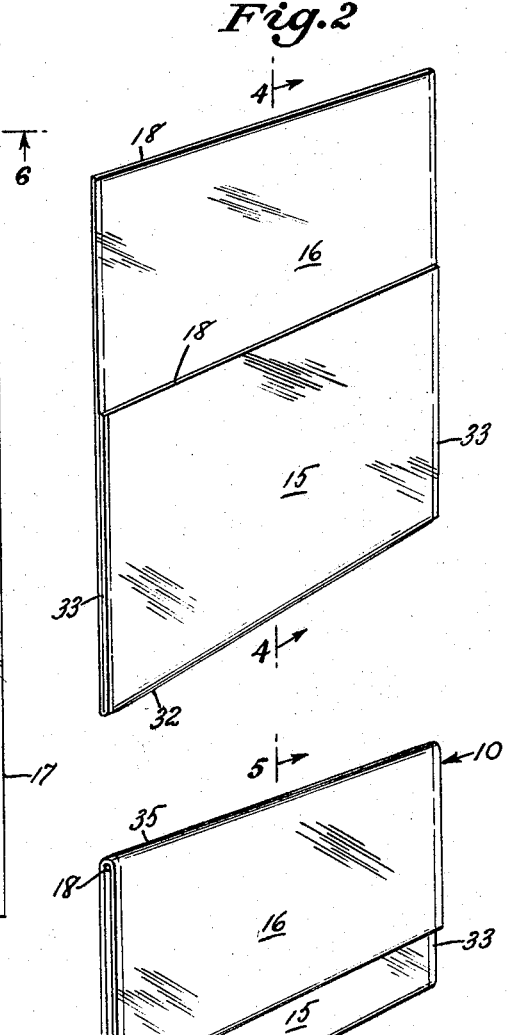
Fig.2
Fig.3
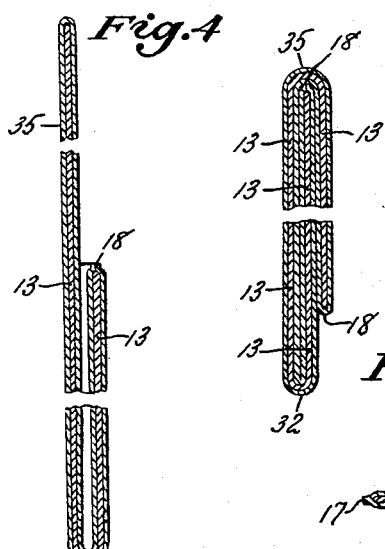
Fig.4  Fig.5
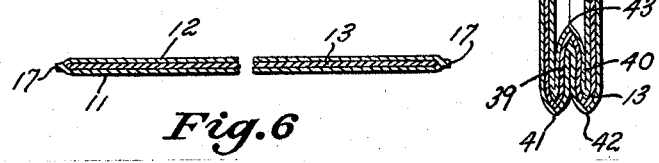
Fig.6
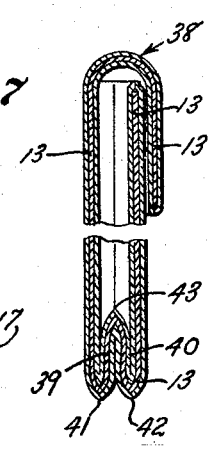
Fig.7

United States Patent Office 3,332,603
Patented July 25, 1967

3,332,603
LAMINATED POUCH CONSTRUCTION
Seymour Kamins, Oceanside, and Norman Rosenberg, Bayside, N.Y., assignors to C-Thru Products, Inc., Brooklyn, N.Y., a corporation of New York
Filed Jan. 5, 1966, Ser. No. 518,816
2 Claims. (Cl. 229—68)

ABSTRACT OF THE DISCLOSURE

The present invention contemplates the formation of a laminated type tobacco pouch in which two outer lamina are heat sealed to each other along the peripheral edges thereof, leaving the relatively centrally disposed areas in unconnected condition. In the interstice formed between the two outer lamina is a sheet of paper or other fibrous material which is completely enclosed, but otherwise unattached, whereby the same may carry advertising material, or other desired information visible through the transparent outer lamina.

---

This invention relates generally to the field of synthetic resinous bags, and more particularly to an improved form thereof of laminated sidewall construction, so as to be particularly suited for use as a container which will be opened and closed many times during its useful life, but which may be fabricated at a cost sufficiently low as to be indispensable when empty. While the invention has application to many forms of containers of this type, it has particular application to relatively small flap-type containers, useful as tobacco pouches, spectacle carriers and the like.

It is among the principal objects of the present invention to provide a pouch construction of laminated type having first and second synthetic resinous lamina enclosing a fibrous intermediate lamina, the laminate forming a relatively stiff non-porous wall particularly suited for holding shredded contents in moistened condition.

Another object of the invention lies in the provision of laminated pouch construction which is integrated entirely by heat-sealing of synthetic resinous materials, and with a complete absence of sewing, gluing or other expensive construction.

A further object of the invention lies in the provision of an improved pouch construction of laminated type, in which the outer laminae thereof are of transparent or translucent material, whereby the central lamina may include decorative or informative indicia which may be viewed beneath a protective layer formed by the outer laminae.

Still another object of the invention lies in the provision of an improved laminated pouch construction possessed of the above advantages, in which the cost of fabrication may be of a very low order, with consequent wide sale, distribution and use.

A feature of the disclosed embodiment lies in the fact that its useful life will normally exceed the holding and dispensing of the contents with which it is originally packed, whereby it may be employed for other purposes suiting the convenience of the purchaser thereof.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a view in elevation, partly broken away to show detail, of a first embodiment of the invention, and showing a first stage in the fabrication thereof.

FIGURE 2 is a view in perspective of the first embodiment showing the same in fully assembled opened condition.

FIGURE 3 is a similar view in perspective of the first embodiment showing the same in closed condition.

FIGURE 4 is a vertical sectional view as seen from the plane 4—4 in FIGURE 2.

FIGURE 5 is a vertical sectional view as seen from the plane 5—5 in FIGURE 3.

FIGURE 6 is a horizontal fragmentary transverse sectional view as seen from the plane 6—6 in FIGURE 1.

FIGURE 7 is a fragmentary enlarged sectional view corresponding to that seen in FIGURE 5, but showing a second embodiment of the invention.

In accordance with the first embodiment of the invention, the device, generally indicated by reference character 10 comprises broadly a first or outer transparent lamina 11, a second or inner transparent lamina 12, and a third intermediate lamina 13.

The first or outer transparent lamina 11 is formed from a suitable transparent or translucent heat-sealable synthetic resinous material, and is of generally rectangular configuration. As best seen in FIGURES 1 and 2, the lamina 11 is bounded by an outer or exposed surface 15, an inner or concealed surface 16, longer side edges 17 and shorter end edges 18, the edges 17 and 18 bordering a heat-sealing area 19.

The second or inner transparent lamina 12 is substantially similar, being bounded by an outer or exposed surface 20, an inner or concealed surface 21, longer side edges 22 and shorter end edges 23, the edges 22 and 23 bordering a corresponding heat-sealing area 24.

The third intermediate lamina 13 is preferably formed of paper or other fibrous material, and includes a first outer surface 26, a second innner surface 27, side edges 28 and end edges 29. It will be observed that while the lamina 13 is also of rectangular configuration similar to that of the first and second laminae 11 and 12, it is of smaller area, so as to lie within the heat-sealing areas 19 and 24. Either or both of the surfaces 26–27 may be printed to display decorative or informative material thereon.

Referring to FIGURE 1, a laminate is formed by heat-sealing the laminae 11 and 12 at the areas 19 and 24 to sandwich the third lamina 13 therebetween. Following this step, a first fold line 32 is formed parallel to the lower end edge 18, and the same becomes the end edge of the completed device shown in FIGURE 2 when abutted portions of the heat-sealing areas 19 and 24 are again mutually sealed to form a composite edge 33 on each side thereof.

The remaining unsealed portion may now be folded downwardly about a second fold line 35 (see FIGURE 3) wherein the device is placed in closed condition.

Turning to the alternate form shown in FIGURE 7, and generally indicated by reference character 38, parts corresponding to the principal form have been designated by similar reference characters with the additional prefix "1."

The alternate form 38 differs from the principal form in the provision of a pair of gusset portions 39 and 40 formed by fold edges 41, 42 and 43 which serve to enlarge the capacity of the device by permitting expansion at the edges 41 and 42. The device 38 is manufactured in the identical manner aas the device 10, except for the formation of the gusset portions 39 and 40 prior to the second heat-sealing operation.

We wish it to be understood that we do not consider the invention limited to the precise details of structure shown and set forth in this specification, for obvious modifications will occur to those skilled in the art to which the invention pertains.

We claim:
1. A synthetic resinous laminated pouch construction comprising: first and second transparent laminae of synthetic resinous material and of generally rectangular configuration, a third intermediate laminae of paper, and of configuration corresponding to that of said first and second laminae, said third lamina being disposed between said first and second laminae, and lying inwardly of the peripheral edges thereof; said first and second laminae being mutually heat-sealed at the peripheral edge portions thereof to enclose said third lamina and form a laminate in which said third lamina is visible therethrough; portions of said laminate being folded upon itself and again interconnected at peripheral portions thereof by heat-sealing to form an envelope having an opening at one edge thereof, a second portion of said laminate being free of interconnection to itself and forming a flap selectively overlying said opening.

2. Structure in accordance with claim 1 in which said laminate is folded a plurality of times to form a gusset along one edge of said envelope prior to said last-mentioned heat-sealing.

References Cited
UNITED STATES PATENTS

| | | | |
|---|---|---|---|
| 2,166,224 | 7/1939 | Shaw | 229—87.5 |
| 2,373,285 | 4/1945 | Baer | 229—55 X |
| 2,966,439 | 12/1960 | Sorel | 161—250 X |
| 3,136,475 | 6/1964 | Geimer | 229—57 |

JOSEPH R. LECLAIR, *Primary Examiner.*

DAVID M. BOCKENEK, *Examiner.*